(12) United States Patent
Lever

(10) Patent No.: US 10,379,521 B2
(45) Date of Patent: Aug. 13, 2019

(54) APPARATUS AND PROCEDURE FOR HOMING AND SUBSEQUENT POSITIONING OF AXES OF A NUMERICAL CONTROL MACHINE

(71) Applicant: ZERAS S.R.L., Pordenone (IT)

(72) Inventor: Andrea Lever, Cavedine (IT)

(73) Assignee: ZERAS S.R.L., Pordenone (IT)

( * ) Notice: Subject to any disclaimer, the term of this patent is extended or adjusted under 35 U.S.C. 154(b) by 247 days.

(21) Appl. No.: 15/531,583

(22) PCT Filed: Jan. 29, 2016

(86) PCT No.: PCT/IB2016/000064
§ 371 (c)(1),
(2) Date: May 30, 2017

(87) PCT Pub. No.: WO2016/120716
PCT Pub. Date: Aug. 4, 2016

(65) Prior Publication Data
US 2018/0284719 A1    Oct. 4, 2018

(30) Foreign Application Priority Data
Jan. 29, 2015   (IT) .................. 102015902324455

(51) Int. Cl.
*B23Q 17/22* (2006.01)
*G05B 19/401* (2006.01)

(52) U.S. Cl.
CPC ......... *G05B 19/4015* (2013.01); *B23Q 17/22* (2013.01); *B23Q 2716/00* (2013.01);
(Continued)

(58) Field of Classification Search
CPC ................................................ G05B 19/4015
(Continued)

(56) References Cited

U.S. PATENT DOCUMENTS 4,225,928 A    9/1980  Ohkubo
5,124,621 A    6/1992  Kawamura et al.
(Continued)

FOREIGN PATENT DOCUMENTS

CN    202752650 U    2/2013
DE    10130498 A1    1/2003
(Continued)

OTHER PUBLICATIONS

RLS, a Reinshaw associate company, LM13 Magnetic Ring Encoder System, Data Sheet LM13D01_04, Issue 4, May 5, 2011, 6 pages.
(Continued)

*Primary Examiner* — David Luo
(74) *Attorney, Agent, or Firm* — Holland & Hart LLP

(57) ABSTRACT

Apparatus for the homing and subsequent positioning of the axes of a numerical control machine. The apparatus includes motion actuators operatively connected to a motor for moving a machine worktable of the apparatus, a control unit, an input/output unit operatively connected to the control unit for the definition of at least one working axis, at least one switching sensor, either of inductive or capacitive type, and at least one switching bar for the definition of at least one switching point identified on the at least one worktable using the at least one switching sensor. The switching sensors and switching points are fixed or mobile, and the at least one switching bar includes a detection area for the at least one switching sensor, the area being shared into a first detection section, a second detection section, and a plurality of protection and fastening areas. The apparatus also includes a sensor housing for the insertion, protection and sliding of one or more switching sensors.

20 Claims, 6 Drawing Sheets

(52) U.S. Cl.
CPC .............. *B23Q 2717/00* (2013.01); *G05B 2219/37094* (2013.01); *G05B 2219/37103* (2013.01); *G05B 2219/50031* (2013.01)

(58) Field of Classification Search
USPC .................................................. 318/560, 34
See application file for complete search history.

(56) References Cited

U.S. PATENT DOCUMENTS

| | | | |
|---|---|---|---|
| 6,076,953 A | 6/2000 | Oakley | |
| 7,923,959 B2 * | 4/2011 | Imai | G03G 15/5008 318/683 |
| 2012/0262156 A1 | 10/2012 | Nitz et al. | |

FOREIGN PATENT DOCUMENTS

| | | | |
|---|---|---|---|
| EP | 2647477 A1 | 10/2013 | |
| GB | 2411475 A | 8/2005 | |

OTHER PUBLICATIONS

PCT International Search Report for PCT International Patent Application No. PCT/IB2016/000064, dated Jul. 18, 2016.

\* cited by examiner

APPARATUS AND PROCEDURE FOR HOMING AND SUBSEQUENT POSITIONING OF AXES OF A NUMERICAL CONTROL MACHINE

TECHNICAL FIELD

The present invention refers to an apparatus for the homing and positioning of the axes of a computer numeric control (CNC) machine.

In addition the present invention refers to a procedure for the homing and the subsequent positioning of the axes of a CNC machine by means of said apparatus.

BACKROUND

Specifically, to the extent hereby applicable, with numeric control machines it is intended work centers, milling cutter, lathes, robots and, more in general, machines characterised by the automatic control and movements of at least one of their components by means of a computer system.

With term "homing" reference is made, generally, to an operation consisting in the resetting of the position of the numeric control machine axes and its selling to a position defined as "zero point", and in the definition of an absolute reference system that allows to detect the position, speed and acceleration in each point of the axes and corresponding tools within the workspace.

More in particular, said operation for the resetting of the axis position (known as "homing"), by means of which the switching point is defined, always refers to a relative positioning, until said operation is not ended.

Thereafter, when said switching point is defined by means of the above said "homing" operation, every subsequent axis positioning becomes absolute and uses incremental measurement systems to provide motion control.

In any case, it is not necessary to use absolute measuring systems.

It is clear that the accuracy and repeatability of said homing procedure are primary aspects for performing measurements and scans with high precision, particularly useful in case of system block due to electrical power failure or whenever should be needed to repeat or restart interrupted operations, to save them on an electronic device (USB, HD, . . . ), to display them on any video device (TABLET, SMARTPHONE, . . . ), to control them by means of peripherals (KEYBOARDS, MOUSE, . . . ), sharing them (network, web, . . . ), modifying them (CAD-CAM software) and reproduce them in the same or in other workspaces without the need to manually find the starting position of the device.

An accurate and reliable homing configuration applied on each axis is also useful to detect any eventual hardware anomaly of the system.

According to the prior art, said homing and subsequent axis and corresponding tools positioning operations in a numerical control machine are mainly achieved by means of mechanical sensors that work on the basis of the end position point of the axis, used as reference system.

In this direction, document n. U.S. Pat. No. 4,225,928 A describes an apparatus for positioning of the axes of a CNC machine by means of a mechanical type sensor.

However, due to clear structural limits of said apparatus, it is noted that axis positioning operations, by means of a mechanical sensor, necessarily lead to a considerably high position error, so that it is necessary the use of a second sensor to correct said position error.

This in mind, it is clear that said known apparatus has, necessarily, an essentially complex structure and of non simple maintenance.

On the other hand, for the above mentioned structural characteristics of said known apparatus, essentially long timing is required for the axes positioning operations, and not always it is possible to obtain a significant accuracy and repeatability level.

Apparatuses for the resetting and positioning procedure of the axes of a numerical control machine are also known from the following patent literature:

U.S. Pat. No. 6,076,953A entitled "Digitizing Probe" filed on 10 Oct. 1995,

GB2411475B entitled "Position detecting system" filed on 24 Feb. 2004,

EP2647477A1 entitled "Device for error correction for CNC machines" filed on 5 Apr. 2012.

Additional drawbacks of said apparatuses consist in the fact that the mechanical end-of-stroke sensors are exposed to an essentially rapid deterioration due to the wear of the components and of the construction materials used.

On the other hand, the sensors used in said known apparatuses to control the machining and for the positioning of axes and corresponding tools and, more generally, of the moving parts of the apparatus, are exposed to considerable stresses, quick wear and dirt, for example determined by machining residuals or lubricating coolants.

The present invention, starting from the notion of the aforesaid drawbacks, intends to provide a solution.

SUMMARY

An object of the present invention is to provide an apparatus for the homing and subsequent positioning of axes of a numeric control machine (CNC) that allows the obtaining of a high level accuracy, with essentially short timing.

It is also an object of the present invention to provide an apparatus as indicated that allows to reach a significant repeatability level of said operation.

It is also an object of the present invention to provide an apparatus as specified, able to provide an adequate protection for the sensor against electromagnetic noise, vibrations, shocks, dust, dirt, machining residuals and humidity, so to preserve the machine's functionality and operating.

Another object of the present invention is to provide an apparatus as mentioned, that allows to substantially prevent the workspaces from the encumbrance required by the mechanical sensors.

Another object of the present invention is to provide an apparatus as said, having a high flexibility level, thus allowing to reach, inside same machine, the easy detection of displacements, the performing of counting operation and the like.

On the other hand it is an object of the present invention to provide an apparatus as specified, having an essentially simple structure, of easy maintenance and relatively reduced costs.

Moreover, it is object of the present invention to further provide a procedure for the homing and subsequent positioning of the axes of a numerical control machine by means of the aforesaid apparatus.

In view of these objects, the present invention provides an apparatus and procedure for the homing and subsequent positioning of the axes of a numerical control machine the essential characteristic of which forms the subject of claim 1.

Further advantageous characteristics of the invention are described in the dependent claims from 2 to 15.

The independent claim 16 refers to a procedure for the homing and subsequent positioning of the axes of a numerical control machine by means of the aforesaid apparatus.

The aforesaid claims are intended as fully incorporated herein.

BRIEF DESCRIPTION OF THE DRAWINGS

The present invention will be more apparent from the detailed description below with reference to the accompanying drawing, provided purely by way of non-limiting example, wherein.

DETAILED DESCRIPTION

Figure 1:
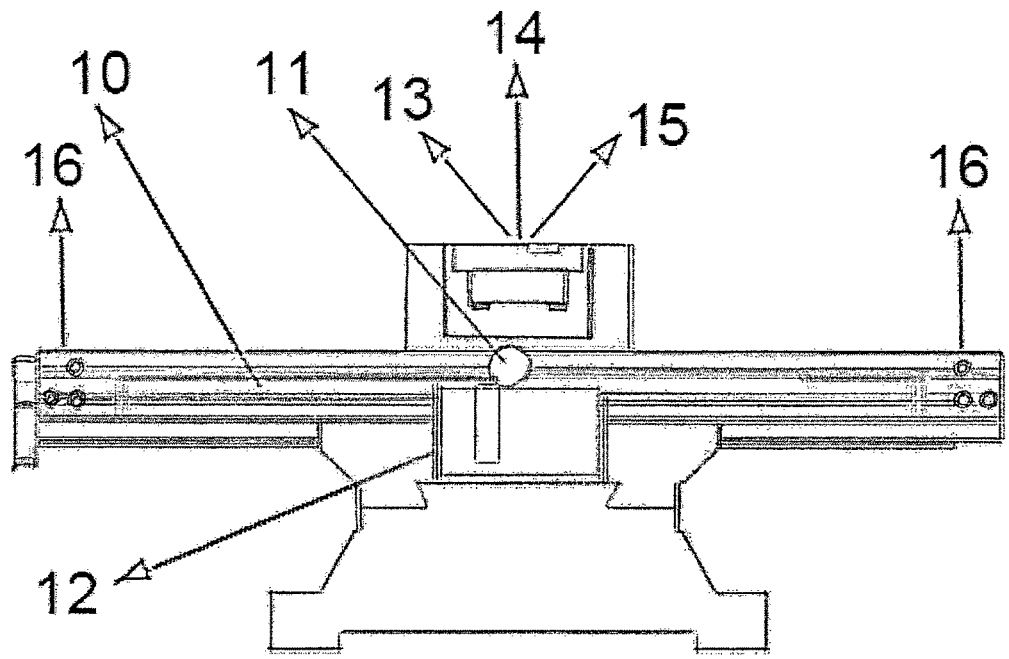
FIG. 1 shows a first preferred embodiment of the apparatus for the homing and subsequent positioning of axes of a numeric control machine.

With reference to the above-mentioned figures, it is hereafter provided the description of a first, respectively a second, embodiment of the apparatus for the homing and subsequent positioning of the axes of a numerical control machine, according to the present invention.

Said apparatus comprises, according to the prior art:
  motion actuator means 13, operatively connected to motor means for moving the worktable of said apparatus,
  a control unit 14,
  an input/output unit 15, operatively connected to said control unit 14 for the definition of at least one working axis.

Advantageously, according to the present invention, said apparatus comprises at least one switching sensor 12, 21, 22, either of inductive or capacitive type, at least one switching bar 10, 30 for the definition of at least one switching point 11, 34 identified on said at least one worktable by means of said at least one switching sensor 12, 21, 22, said switching sensors 12, 21, 22 and switching points 11, 34 being fixed or mobile, said at least one switching bar 10, 30 comprising a detection area for said at least one switching sensor 12, 21, 22, said area being shared into a first 18, 31, respectively a second 17, 32 detection section, and a plurality of protection and fastening areas 16, and a sensor housing 20 for the insertion, protection and sliding of one or more switching sensors.

In this way, by means of a high commutation frequency of the signal emitted by said at least one sensor 12, 21, 22 for at least one axis, and for the high reliability level of said at least one sensor 12, 21, 22, that operates without contact and in an essentially immune to electromagnetic noise, vibrations, impacts, dust, dirt, machining residuals and humidity environment, the homing and positioning of said at least one axis is done with high level of accuracy and repeatability.

Conveniently, in the illustrated embodiment (FIGS. 2a and 2b), said switching bar 10 has a groove that defines said second detection section 17.

It will also be noted that the use of said at least one switching sensor 12, 21, 22, either inductive or capacitive, allows to sensibly reduce the overall space within the workspaces, thus allowing to perform the end-of-stroke definition operations by means of software means, starting from a known point identified by the signal switching of said at least one proximity sensor, fixing the drawbacks of the prior art.

According to the present invention, thus solving the drawbacks of the prior art.

According to the present invention, it is possible to use any kind of proximity sensor of the inductive or capacitive type.

Preferably said at least one sensor 12, 21, 22, inductive or capacitive, is an NC type sensor (namely a sensor able to continuously emit a signal, and interrupt the same if positioned at a minimum distance from a metallic object) or a NO type (namely a sensor that emits signal if positioned at a minimum distance from a metallic object and interrupts the same if moved away); said sensors are used in the claimed apparatus in different shapes, sizes, materials depending on the needs of the industrial application and characteristics of the working environment.

Depending on the chosen type of sensor, it is possible to modify orientation, intensity, frequency, encumbrance and detection surface precision.

Said at least one switching point 11, 34 is a known point individuated on said axes, and represents the point where said at least one switching sensor 12, 21, 22 changes its status, thus allowing to detect the coordinate of the point and to set it as a reference for said axis.

Figure 2A:
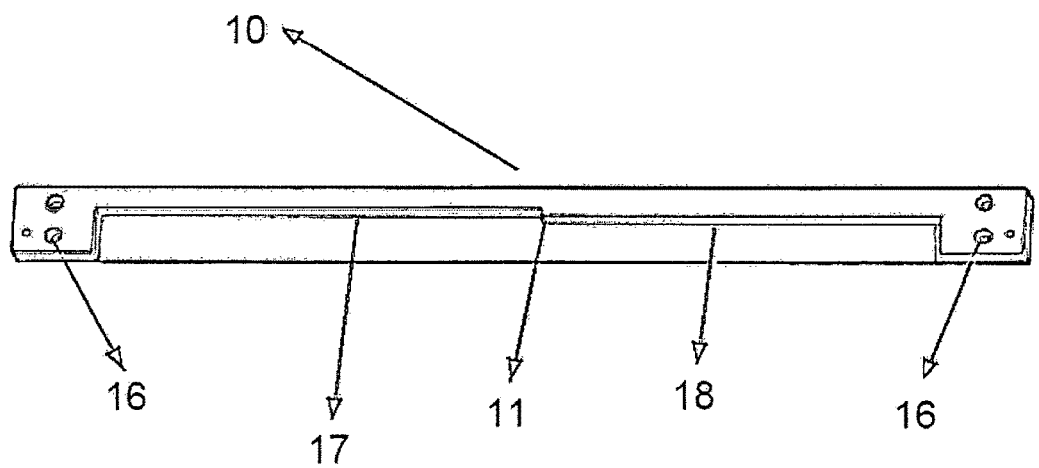
FIG. 2 shows an isometric section view of an embodiment of the switching bar (2a) and the construction details of the switching bar (2b) of the apparatus of FIG. 1.
Figure 2B:
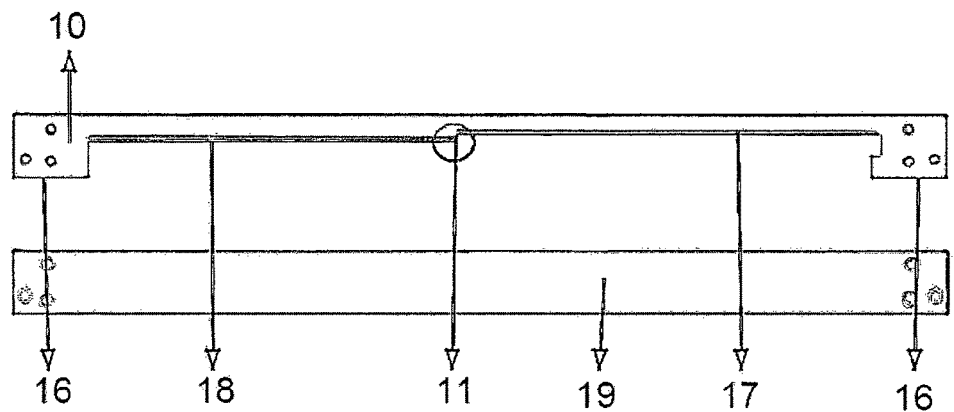

Reference is now made to FIGS. 2a and 2b, that respectively show an isometric section view (FIG. 2a) of said first preferred embodiment of the switching bar and the additionally construction details (FIG. 2b) of the switching bar 10.

Conveniently, in said illustrated embodiment (reference is also made to FIG. 1), the switching bar 10 is made in ferromagnetic material, comprising said protection and fastening areas 16 and said first 18 and respectively second 17 detection sections.

In this case, the switching point 11 is defined in the point in which said at least one switching sensor 12 changes its status.

The switching point 11 corresponds to the connection point between sections 17 and 18.

On the other hand, by means of using inductive or capacitive proximity sensors that are able to close a circuit when they are sufficiently brought near to a ferromagnetic surface or to a material having dielectrics properties, able to provide a measurable signal, an absolute reference point is defined for each axis, that always allows to know with accuracy the position of the axes, and so of the worktable, in space.

In variant (not illustrated) said at least one switching bar is made of a dielectric material, and comprises said protection and fastening areas and said first, respectively second, detection sections.

As an example, said dielectric material can be a polymeric material, wood, paper, glass or any other type of material detectable by means of a capacitive sensor.

Advantageously, said switching bar can be made of flexible dielectric material (for example, a flexible polymeric material).

Advantageously, according to invention, said first 18, and respectively second 17, detection sections can be made of different materials, according to what is needed.

Conveniently, according to a non illustrated embodiment, said switching point can be suitably moved, without the need for replacement of the switching bar.

In an embodiment (not illustrated) of the apparatus according to the invention, said switching bar has essentially a circular shape.

On the other hand, in a further embodiment (not illustrated) of the present invention, the switching bar comprises a plurality of layers made in different materials, selected according to convenience.

It will be noted that the presence of multilayer structure allows the contemporary use of a plurality of inductive proximity sensors.

Conveniently, according to the present embodiment of the invention, said sections 17 and 18 are adjacent, have different heights and have their surface perpendicular to the axis of detection of said at least one sensor 12 mounted in a perpendicular way with respect to the axis of detection of said at least one sensor 12.

In present embodiment of the invention:
the surface of said first section 18, perpendicular to the axis of detection of said at least one sensor 12, has a distance from said at least one sensor 12 lower than the maximum detection distance of said at least one sensor 12;
the difference in level between the surface of sections 17, perpendicular to the axis of detection of said at least one sensor 12, and the surface of the section 18 perpendicular to the axis of detection of said at least one sensor 12, is preferably of at least 5 mm.

The distance between the surface of the section 17, perpendicular to the axis of detection of said at least one sensor 12, and said at least one switching sensor is at least 7 mm.

On the other hand, it is noted that said surface of section 18, perpendicular to the axis of detection of said at least one sensor 12, is detected, while the surface of the section 17, more distant with respect to said at least one sensor 12, is not detected.

It is obviously understood that the above-mentioned distances and sizes, indicated with reference to this embodiment, are to be considered purely as an example and so not restrictive, since different parameters can be conveniently used depending on the type of switching sensor used and its construction features.

As previously indicated, said switching bar 10 comprises said protection and fastening areas 16, with the function to protect said at least one switching sensor 12 from dirt.

Said protection and fastening areas 16 are not detected by said at least one sensor 12.

Said protection areas are also used in order to simplify the installation of the same switching bar 10, further than for fixing a protective cap 19.

Said protective cap 19 is easily removable and, in addition to the function of protection from dirt and external agents, it allows the performance of rapid maintenance operations of the apparatus, without the need to perform the parallelism recalibration. Preferably, said switching bar 10 is fixed with respect to the worktable by means of grooves provided on cross-tables, without the need of any structural modification of the machine.

In this embodiment, said switching bar 10 has a minimum length equal to the stroke length of the axis; for aesthetic reasons and for convenience of assembly, said bar is preferably made with the same length L of the axis on which it is mounted.

For example, the length of the switching bar 10 is equal to the axis stroke length and the material is aluminium ANTICORODAL (6060 T6).

This allows the achievement of the advantageous technical effect according to which the calculation of the "zero position" of the machine is carried out in complete autonomy, if necessary.

Figure 3:
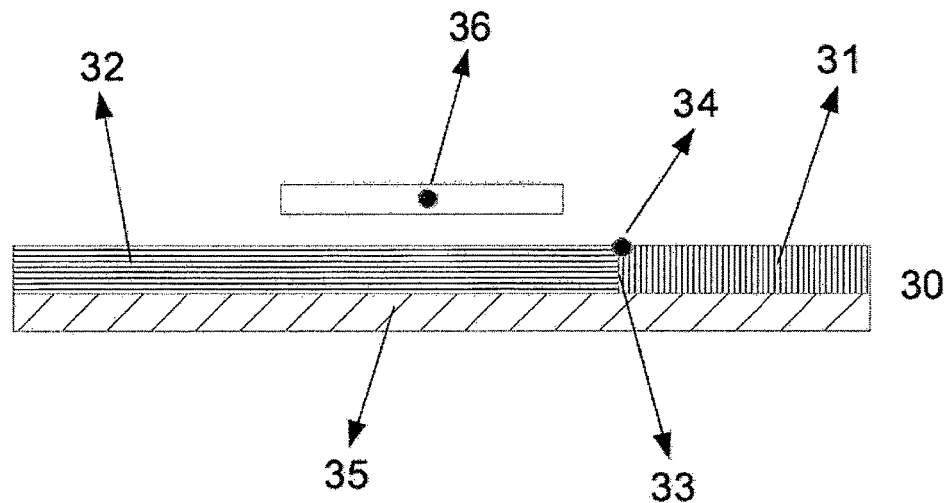
FIG. 3 shows the detail of a further embodiment of the switching bar.

FIG. 3 shows a second embodiment of the invention in which the switching bar 30 has no groove and, at the same time, it is characterized by a plurality of materials having different ferromagnetic features, said materials possibly present in a multilayer form.

The further structural features of said second embodiment of the invention, in common with said first embodiment, to which reference is made, are not further described here. More in particular, according to the present embodiment, said switching bar 30 is made of multiple materials, each one having its own ferromagnetic features, said switching bar comprising a first section of material 31, a second section of material 32, a contact surface 33, a switching point 34, a section of protective and supportive material 35, the thickness of the sections 31 and 32 being comprised between 1 and 10 mm.

In the switching bar 30, the switching of said at least one switching sensor 36 takes place at the switching point 34, obtained by contacting of material section 31 with the material section 32, through the contact surface 33 and said materials, having different ferromagnetic features.

The thickness of the sections 31 and 32 is preferably comprised between 1 mm and 10 mm, depending on the usage environment and on the type of materials.

The type of commutation sensor 36 influences the choice of the above said materials, the quantity and the thickness of the same.

In one embodiment of the switching bar 30, said at least one switching sensor 36 is preferably an inductive proximity sensor.

The switching bar 30 is characterized by a further section 35 having the function of supporting the sections 31 and 32 and, further, the function of protecting said at least one switching sensor 36.

The material of the section 35 may be the same as one of the materials of the sections 31 or 32, or it can be different from both.

Figures 4A, 4B:
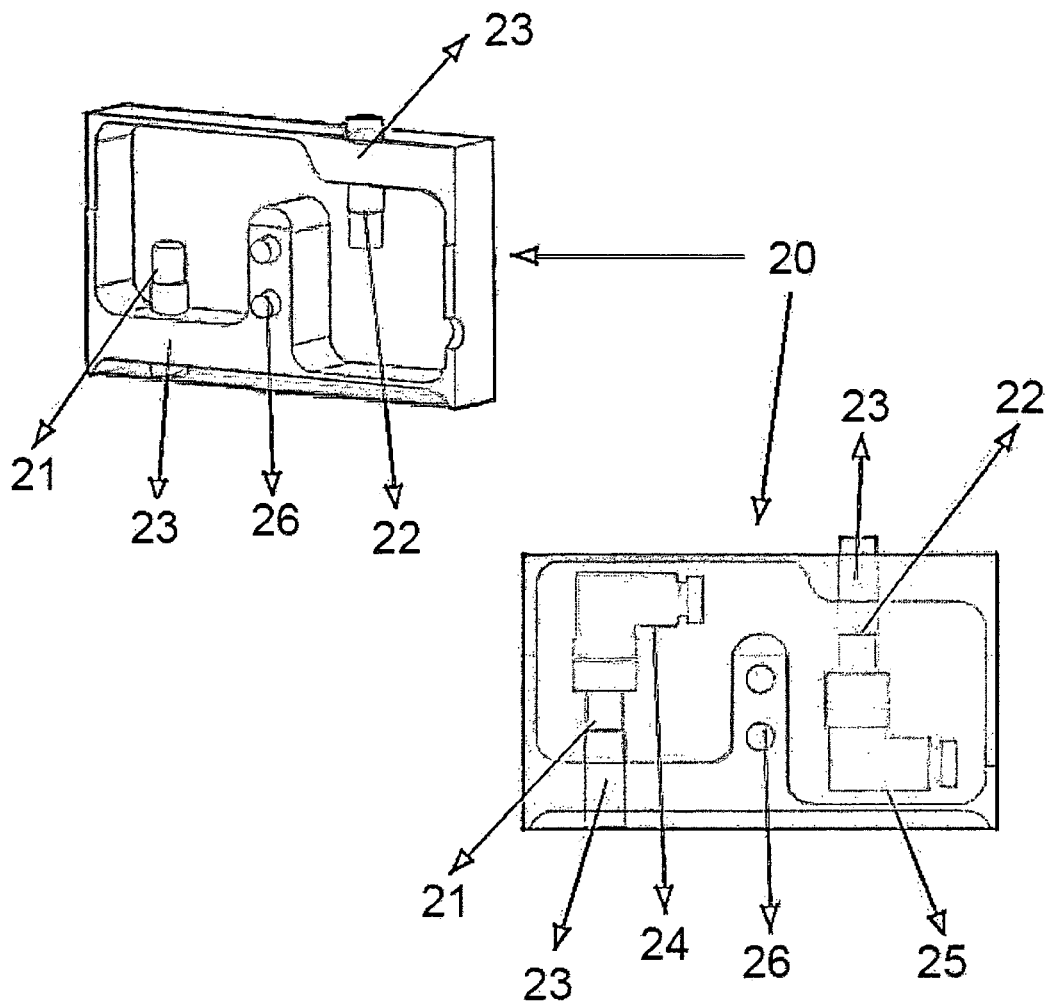
FIG. 4 shows a preferred embodiment of the sensor housing in isometric view (4a), in front section (4b) and in cross section (4c)
Figure 4C:
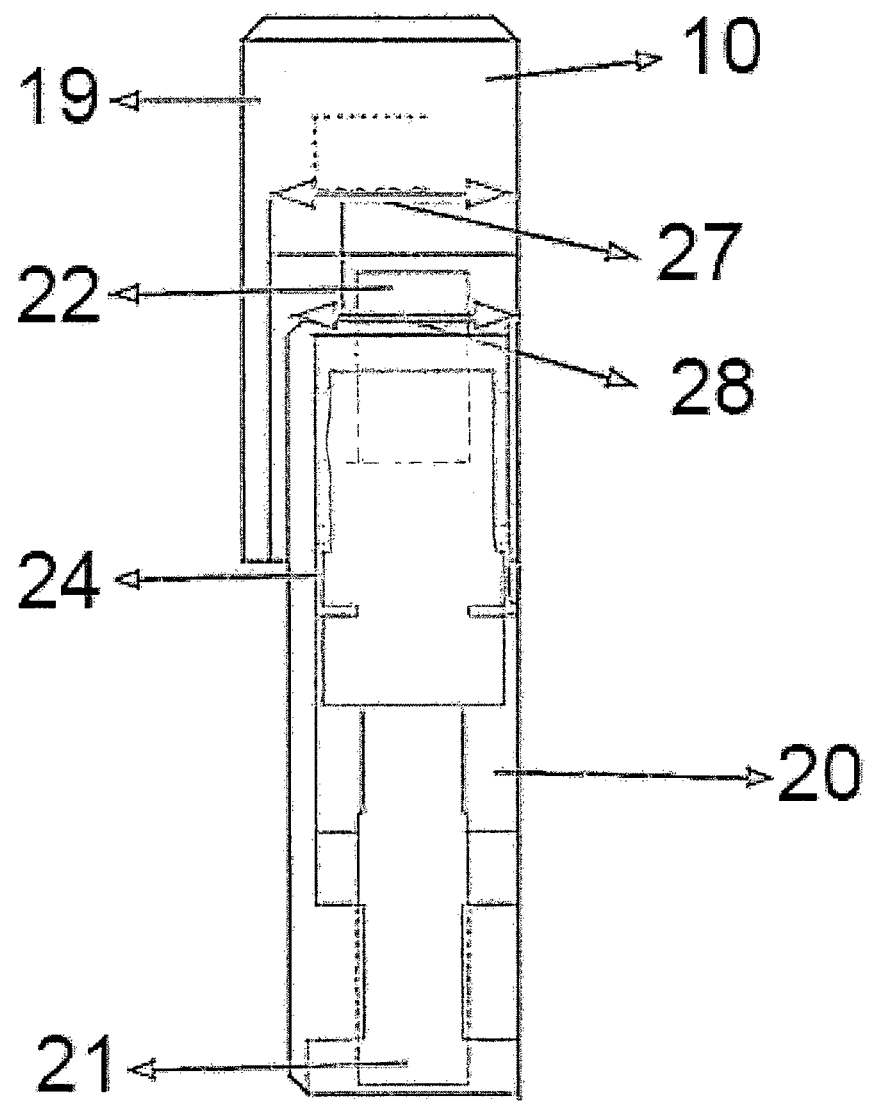

The FIGS. 4a, 4b and 4c show a preferred embodiment of the sensor housing 20 of the apparatus according to the invention.

Said sensor housing 20 may contain one or more switching sensors and, further, a plurality of sensor housings 20 may be present in the apparatus according to the invention.

In the embodiment illustrated in the aforementioned figures from 4a to 4c, said sensor housing 20 comprises two inductive sensors 21, 22, the sensor 21 operating along the work axis Y and the sensor 22 operating along the axis X.

In said embodiment, the sensor 22 is fixed and switches on a switching bar 10 in motion while the sensor 21 is mobile and switches at a fixed switching point.

In variant, the sensor 22 is mobile and switches at a fixed switching point, while the sensor 21 is fixed and switches on a switching bar 10 in motion.

What described finds, in particular and conveniently, application with reference to numerical control work centres provided with X-Y cross tables.

Sensors 21 and 22 are inserted in specific holes 23 obtained in the sensor housing 20, said holes with thread; the sensor position is adjusted upwards and downwards by a rotary movement, screwing or unscrewing.

This adjustment allows raising and lowering the height of the sensor with respect to the switching point.

Said sensor housing 20 further comprises the wiring elements 24 and 25 that connect the sensors to the control unit 14 and to the input/output unit 15.

The sensor housing 20 is fixed with respect to the worktable by means of the mounting points 26.

In particular, the cross section in FIG. 4c shows a detail of the sensor housing 20, containing the switching sensors 21, 22, and the wiring elements 24 and 25.

Above said sensor housing 20 it is placed said switching bar 10, protected by the protection cap 36.

The sensor housing 20 comprises a first portion 28 and slides inside a second portion 27, being the thickness of said second portion 27 greater than said first portion 28 (see FIG. 4c).

Said preferred embodiment allows the sliding of the inductive sensor 22, comprised in the sensor housing 20 and comprising said first portion 28 (FIG. 4c), in a parallel direction with respect to the detection sections 17 and 18.

The sensor housing 20 protects the switching sensors from dirt, simplifies the assembly of the sensors and reduces the space in the numerical control machine.

In one embodiment of said sensor housing, the ends of sensor 21 and 22 that remain exposed and that perform the measurements are protected by non-ferromagnetic materials.

Advantageously, said sensor-housing 20 is provided with wiring elements 24 and 25 and screwing means 23 to adjust the position of each sensor 21 and 22; therefore the inductive switching sensor 22 is adjusted by screwing or unscrewing, at a distance from the surface 18 less than 5 mm, preferably less or equal to 3 mm from said surface. In another embodiment of the present invention (not illustrated) said sensor housing, respectively said at least one switching sensor, comprises receiving/transmitting means in wireless mode, for the operational interaction with said control unit, respectively said input/output unit.

In particular, this allows to overcome the drawbacks related to the presence of wirings or different physical connections.

Figure 5:
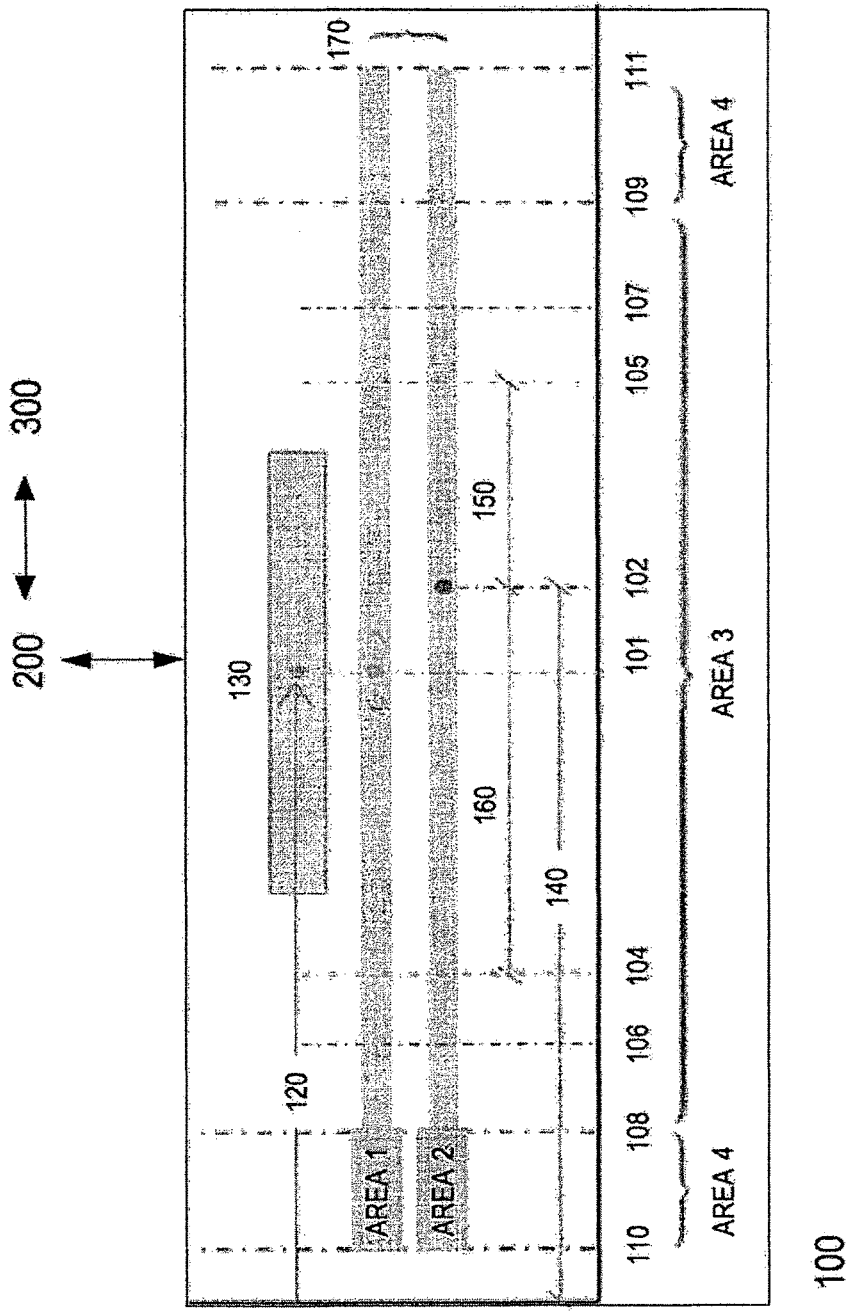
FIG. 5 shows a schematic view of the elements involved in the procedure for the homing and subsequent positioning of working axis.

In a further embodiment of the present invention, (not illustrated) said control unit, respectively said input/output control unit, can be comprised in said sensor housing. FIG. 5 shows a schematic representation of the elements involved in the homing and positioning procedures of an axis.

With reference to the aforementioned figure, the following elements comprised in the apparatus for the positioning of the axes of a numerical control machine are defined, according to the invention:

100: motorized workspace of the worktable;
200: control unit;
300: input/output unit;
101: inductive sensor or switching point, in motion;
102: inductive sensor or switching point, fixed;
104: left end-of-stroke defined by the input/output unit;
105: right end-of-stroke defined by the input/output unit;
106: left end-of-stroke defined by hardware;
107: right end-of-stroke defined by hardware;
108: physical left limit for the movement the worktable 130;
109: physical right limit for the movement of the worktable 130;
110: left side limit of the machine's safety zone;
111: right side limit of the machine's safety zone;
Area 1: area where the positioning the point 101 is possible;
Area 2: area where the positioning the point 102 is possible;
Area 3: area that delimits the points that are within the motion limits of the worktable 130 in motion, delimited by points 108 and 109;
Area 4: area that comprises the safety points external from the motion area of the worktable 130, respectively delimited by points 108, 110, 109 and 111;
120: displacement of the motorized worktable, that is visualized by means of the input/output unit;
130: worktable length;
140: position value of point 102, known a priori;
150: position of the right end-of-stroke with respect to point 102. The position value is defined by means of the input/output unit;
160: position of the left end-of-stroke with respect to point 102. The position is defined by means of the input/output unit;
170: space between Area 1 and Area 2 having a dimension that is less than 10 mm, preferably with a dimension comprised between 2 and 3 mm, depending on the detective capacities of the inductive sensor used.

The point X ("resetting" or "homing") or X(Z) is defined as the resetting point of the axis, at the moment of the switching of the inductive signal.

Advantageously, said control unit 14 comprises:
a motor drive,
a motor control board, by means of pulse train signals and analog signals,
FPGA boards.

In particular, said control unit receives data from all the switching sensors, performs a data processing if needed, and transfers data to the input/output unit 15.

Said motion actuators 13 comprise motors to move the worktable, for example stepper/brushless/DC/AC motors.

The input/output unit 15 comprises a computer based "motion control system" that handles up to nine interpolated axes univocally defining the motion laws.

Said computer system is compatible with the ISO code and allows to perform simulations and real-time operations, in order to control motor parameters including:
proper frequency of the signal,
trapezoidal speed and acceleration profiles,
axis motion calibration,
backlash error compensation.

The input/output unit 15 monitors the feedbacks and error signals of the motion actuators means 13.

Advantageously, the above described apparatus comprises the use of switching bars of the signal emitted by the proximity sensors having different shapes and dimensions depending on the homing procedure applied, the type of sensors, the positioning and control of the worktable/tools.

After having performed the "homing" procedure, it is possible to proceed, through a precise and controlled movement of a body in space and the generation of further detectable surfaces, for example through a spray of a paint, to scan and detect, with similar inductive or capacitive proximity sensors, the presence of objects in absence of contact and radiations.

Figure 6A:
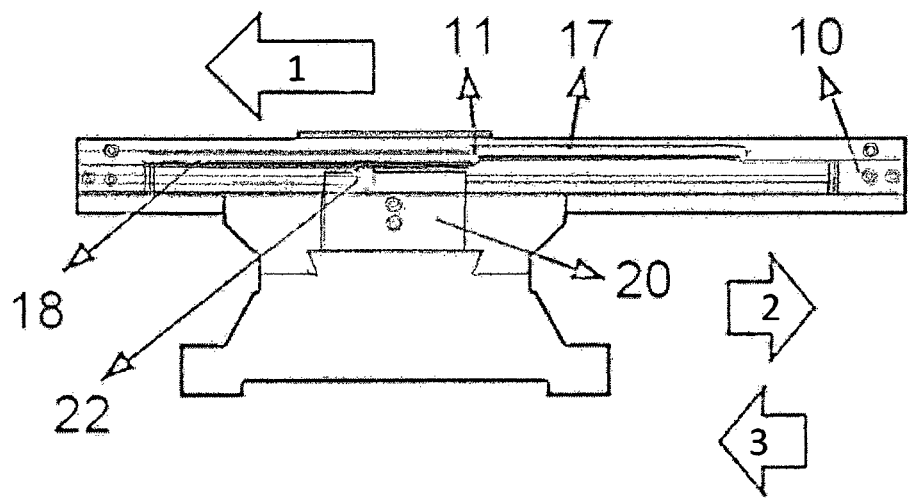
FIGS. 6a and 6b schematically show respective embodiments of the homing and subsequent positioning procedure of the X-axis of the numeric control machine, by using the apparatus described in the present invention.
Figure 6B:
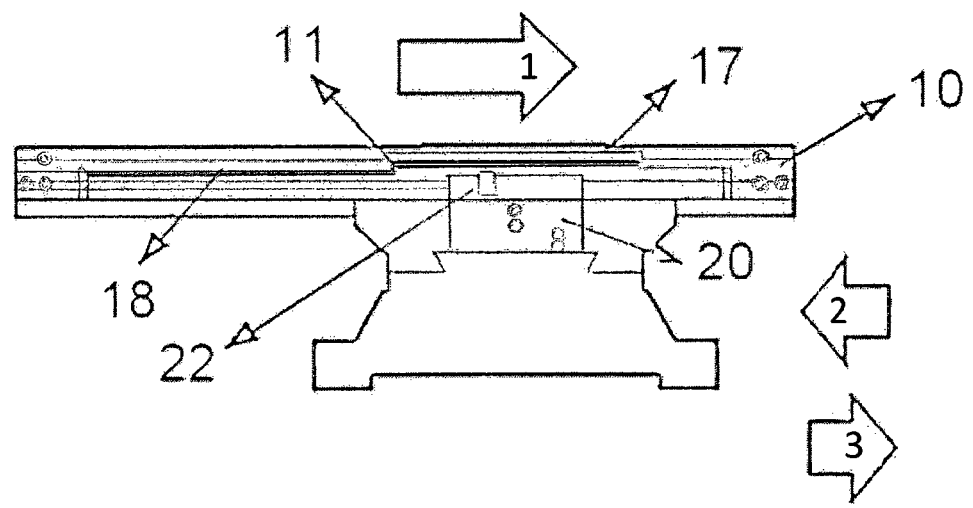

Procedure for the Homing and Subsequent Positioning of the Axes of a Numerical Control Machine by Means of the Described Apparatus It is hereafter described an embodiment of a procedure for the homing and subsequent positioning of the axes of a numerical control machine by means of the described apparatus (FIG. 6a and FIG. 6b).

Said procedure comprises the following steps:

detecting of presence/absence of contact between said at least one sensor 22 and the surface of the section 18 of the switching bar 10, perpendicular with respect to the detection axis of said at least one sensor 22, fast moving of the worktable until losing/finding again contact of said at least one sensor 22 with the surface of the section 18, perpendicular with respect to the detection axis of said at least one sensor 22;

slow moving of the worktable in a direction opposite to the previous until finding again/losing contact of said at least one sensor 22 with the surface of the section 18, perpendicular with respect to the detection axis of said at least one sensor 22, slow moving of the worktable in a direction opposite to the previous until losing/finding again the contact of said at least one sensor 22 with the surface of the section 18, perpendicular with respect to the detection axis of said at least one sensor 22;

saving of the coordinates of the switching point 11;

setting of the left end-of-stroke and the right end-of-stroke of said worktable depending on the detected switching point 11, positioning of said worktable in a predefined working area.

It is will be noted that the positioning step prior to the homing can be minimized by a proper choice of the switching point.

Moreover, starting from the homing, the possibility to define by means of software means the left and right end-of-stroke of each individual axis, allows to realise absolute positioning within adjustable working areas, according to convenience, without making any hardware modification to the apparatuses.

In a preferred embodiment of the invention, said homing procedure and subsequent positioning of the axes of a numerical control machine, it is provided that said displacement X(Z) is detected by means of the inductive signal switching of the inductive sensor 102, characterized by a change of magnetic field.

The signal of the inductive sensor 102—a very rapid variation of induced current in the sensor—is transmitted to the control unit 200, connected through a cable to the sensor. The control unit sends the information to the input/output unit 300 that shows on video screen, in real time, acquisition value and variation of the signal.

When the switching takes place, the homing point is X (Z)=101=102.

The position of the homing point within the safety area of the machine depends on several factors; as an example, thus not exhaustive, here are listed some of said factors:

the geometry of the machine, intended as encumbrance, ease of assembly, design, safety and wiring;

the internal and external encumbrances with reference to the area of movement of the axes of the machine. In one embodiment of the positioning system an extension to move said encumbrances from Area 3 to Area 4, is used;

time optimization of both homing and positioning of machining operations. The overall timing is reduced with the introduction of switching bars. Moreover, the overall timing can be reduced by positioning the zero point of the machine at the point where the largest number of machining operations takes place, according to the probability distribution of the considered axis;

need to avoid collisions. In some axes the choice of the switching point significantly affects safety. In a particular embodiment of the invention, the homing of the Z-axis is done moving upwards, to avoid potential collisions with objects mounted on the worktable, and the size of which can be unknown. In this embodiment, a switching bar is not provided, due to the potential safety problems generated by the motion reversal that takes place during the steps of researching the switching point.

In a preferred embodiment, the homing procedure takes place starting from the Z-axis. Said procedure, according to the present invention, allows to define with great accuracy, and display on video screen, the working area of each numerical control machine—1D, 2D or 3D—allowing through several configurations to set the "zero positions" of the machine, by which define the end-of strokes through software means, a 3D space where to interpolate position, speed and torque of each axis, including the rotation speed of the spindles.

In one embodiment of the homing procedure, the point in which the sensor switches its status is located at the middle of the axis stroke, so providing said actuation, the halving of the homing timing.

The present invention has been described for illustrative, but not limitative purposes, but it is to be intended that variations and/or modifications may be made by those skilled in the field, this without exiting from the relative field of protection, as defined by the claims herewith attached.

As evident in the light of the aforementioned, said apparatus for the homing and subsequent positioning of axes of a numerical control machine (CNC) allows the obtaining of a high level accuracy, with essentially short timing.

Further, said apparatus as indicated allows to reach a significant repeatability level of said operation.

In adding, said apparatus as specified, is able to provide an adequate protection for the sensor against electromagnetic noise, vibrations, shocks, dust, dirt, machining residuals and humidity, so to preserve the machine's functionality and operating.

Moreover, said apparatus as mentioned, allows to substantially prevent the workspaces from the encumbrance required by the mechanical sensors.

Furthermore, said apparatus as said, has a high flexibility level, thus allowing to reach, inside same machine, the easy detection of displacements, the performing of counting operation and the like.

On the other hand, said apparatus as specified, has an essentially simple structure, of easy maintenance and relatively reduced costs.

Moreover, the present invention further provides a procedure for the homing and subsequent positioning of the axes of a numerical control machine by means of the aforesaid apparatus.

As clear from the foregoing, the present invention allows the objects set forth in the introduction to be achieved in a simple and effective manner.

The invention claimed is:

1. An apparatus for homing and subsequent positioning of axes of a numerical control machine, comprising:

motion actuators operatively connected to at least one motor for moving a machine worktable of the apparatus;

a control unit;

an input/output unit operatively connected to the control unit for the definition of at least one working axis;

at least one switching sensor, either of inductive or capacitive type;

at least one switching bar defining at least one switching point on the machine worktable using the at least one switching sensor, the at least one switching sensor and the at least one switching point being fixed or mobile, the at least one switching bar comprising a detection area for the at least one switching sensor, the detection area being shared into a first detection section, a second detection section, and a plurality of protection and fastening areas;

a sensor housing for the insertion, protection and sliding of the at least one switching sensor;

wherein the at least one switching sensor emits a high commutation frequency signal for the at least one working axis;

wherein the at least one switching sensor operates without contact and is essentially immune to electromagnetic noise, vibrations, impacts, dust, dirt, machining residuals and humidity environment;

wherein the apparatus operates to provide the homing and positioning of the at least one working axis with high level of accuracy and repeatability.

2. The apparatus according to claim 1, wherein the switching bar comprises a groove that defines at least one of the first detection section and the second detection section.

3. The apparatus according to claim 1, wherein the at least one switching bar is made of ferromagnetic material and comprises the plurality of protection and fastening areas and the first and second detection sections.

4. The apparatus according to claim 1, wherein the at least one switching bar is made of dielectric material and comprises the plurality of protection and fastening areas and the first and second detection sections.

5. The apparatus according to claim 4, wherein the switching bar is made of flexible dielectric material.

6. The apparatus according to claim 1, wherein the first and second detection sections are made of different materials.

7. The apparatus according to claim 1, wherein the switching bar has an essentially circular shape.

8. The apparatus according to claim 1, wherein the switching bar comprises a plurality of layers made of different materials.

9. The apparatus according to claim 1, wherein the first and second detection sections and are adjacent to each other, have different heights and have relative surfaces, which are arranged perpendicular to a detection axis of the at least one switching sensor, mounted in a perpendicular way with respect to the detection axis of the at least one switching sensor.

10. The apparatus according to claim 1, wherein a distance between the at least one switching sensor with respect to a surface of the first detection section, which is arranged perpendicular to a detection axis of the at least one switching sensor, is smaller than a maximum detection distance of the at least one switching sensor.

11. The apparatus according to claim 1, wherein the at least one switching bar is made of multiple materials, each material ferromagnetic properties, the at least one switching bar comprising a first section of material, a second section of material, a contact surface, a switching point, and a section of protective and supporting material, a thickness of the first and second sections of material being between 1 and 10 mm.

12. The apparatus according to claim 1, wherein the at least one switching bar has a minimum length equal to a stroke of the machine worktable on which the at least one switching bar is mounted.

13. The apparatus according to claim 1, wherein the sensor housing comprises wiring and screwing members for the adjustment of a position of the at least one switching sensor.

14. The apparatus according to claim 1, wherein the sensor housing and the at least one switching sensor comprise wireless receiving/transmitting features for operative interaction with respect to the control unit and the input/output unit, respectively.

15. The apparatus according to claim 1, wherein the control unit comprises:

a motor drive;

a motor control board operable using pulse train signals and analog signals

FPGA boards;

wherein the control unit receives data from the at least one switching sensor, performs data processing if needed, and transfers data to the input/output unit.

16. A method for homing and subsequent positioning of axes of a numerical control machine, comprising:

detecting presence/absence of contact between at least one switching sensor and a surface of a first section of a switching bar, the surface being arranged perpendicular relative to a detection axis of the at least one switching sensor, moving the worktable at a first speed in a first direction until losing/finding again contact of the at least one switching sensor with the surface of the first section;

moving the worktable at a second speed, slower than the first speed, in a second direction opposite to the first direction until finding again/losing contact of the at least one switching sensor with the surface of the first section;

moving the worktable at a third speed in the first direction until losing/finding again contact of the at least one switching sensor with the surface of the first section;

saving coordinates of a switching point, the switching point being determined by the at least one switching sensor;

setting a left end-of-stroke and a right end-of-stroke of the worktable depending on the detected switching point;

positioning of the worktable in a predefined working area.

17. An apparatus for homing and subsequent positioning of axes of a numerical control machine, comprising:

a worktable;

a plurality of motion actuators operatively connected to at least one motor to move the worktable;

a control unit;

an input/output unit operatively connected to the control unit and defining at least one working axis;

at least one switching sensor configured to emit a high commutation frequency signal, the at least one sensor operates without contact and is essentially immune to electromagnetic noise, vibrations, impacts, dust, dirt, machining residuals and humidity environment at least one switching bar comprising a detection area for the at least one switching sensor, the detection area being shared into a first detection section, a second detection section, and a plurality of protection and fastening areas;

at least one switching point on the worktable, the at least one switching sensor and the at least one switching point being fixed or mobile;

a sensor housing for insertion, protection and sliding of the at least one switching sensor;

wherein the apparatus operates to provide the homing and positioning of the at least one working axis with accuracy and repeatability.

18. The apparatus according to claim 17, wherein the switching bar comprises a groove that defines at least one of the first detection section and the second detection section.

19. The apparatus according to claim 17, wherein the at least one switching bar is made of ferromagnetic material and comprises the plurality of protection and fastening areas and the first and second detection sections.

20. The apparatus according to claim 17, wherein the at least one switching bar is made of dielectric material and comprises the plurality of protection and fastening areas and the first and second detection sections.

* * * * *